United States Patent Office 3,372,939
Patented Mar. 12, 1968

3,372,939
ROTARY FACE SEAL WITH VIBRATION DAMPING MEANS
Raymond A. Coulombe, Adelphi, and Ernest J. Taschenberg, Baltimore, Md., assignors to Kopper Company, Inc., a corporation of Delaware
Filed Oct. 22, 1965, Ser. No. 501,329
3 Claims. (Cl. 277—88)

ABSTRACT OF THE DISCLOSURE

A face seal for a rotatable shaft having a bellows and a vibration damping finger engaging a wear-resistant surface connected to the bellows for damping vibration in the bellows.

---

This invention relates generally to seals and more particularly to bellows supported rotary face seals.

In applications where environmental conditions such as a corrosive gaseous atmosphere have adverse effects on most organic seal materials, resilient metal bellows are substituted for the elastomeric materials commonly used as sealing elements to seal one zone through which a rotatable shaft passes from another zone. Conventionally, the bellows is joined to a bellows carrier on one end and to a seal ring carrier on the opposite end. Sealing is accomplished by contact of the seal ring, usually stationary, with a mating ring joined to a rotating shaft. The bellows acts as a secondary seal to prevent fluid transfer from one chamber to another and also biases the seal ring into engagement with the mating ring at the correct sealing pressure.

Under ideal operating conditions, the mating ring rotates smoothly and continuous contact is maintained between the sealing surfaces. In actual practice, however, several factors may be present to introduce vibration or oscillation in the bellows. For instance, the shaft may pulsate due to its connection to other rotating parts. Vibration may also be caused by wobbling motion of the mating ring if it is not perpendicular to the shaft. Another cause of vibration is the friction between the sealing surfaces tending to impart a stick-slip motion to the sealing surfaces. Vibration may even be caused by turbulence in the medium being sealed. The vibrations thus introduced detrimentally affect the assembly; causing failure of the bellows from fatigue, fraction of the seal ring in extreme cases; spawling or chipping of the edge of the seal ring; and permitting actual physical separation of the sealing faces with resultant leakage.

In most liquid environments, these vibrations are not a serious problem since the liquid reacts with the bellows to dampen the vibrations, although damping is sometimes required in special cases. However, in gaseous applications, no such beneficial result occurs. Hence, it becomes necessary to provide auxiliary damping. Merely increasing the bellows compression results in excessive pressure between the sealing faces. The advent of advanced technology wherein it has become necessary to seal high pressure gases which may be corrosive or excessively hot or cold or which may otherwise adversely affect elastomers, it has become increasingly essential that a damping means be provided which is not adversely affected by such gases.

Accordingly, an object of the present invention is to provide a bellows supported rotary face seal utilizing vibration damping means unaffected by gas or liquid characteristics.

Another object of the present invention is to provide a vibration damper unaffected by corrosive or high or low temperature environments and effective to lessen the damage caused by excessive vibration.

This invention contemplates the provision of a resilient member, preferably metallic, secured to the bellows carrier or housing and in contact with the periphery of the bellows to absorb and dissipate vibrational energy introduced in the bellows and thereby diminish the amplitude and increase the period of such vibrations. Additional means may be provided as a wear surface between the damper and the bellows.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

Figure 1:
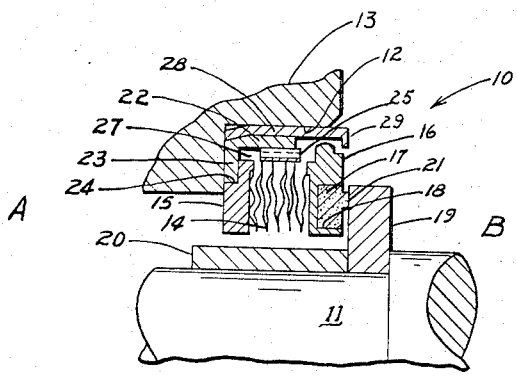
FIGURE 1 is an elevational view of the seal assembly in cross-section showing the preferred embodiment of the invention.

Referring now to FIG. 1, there is illustrated a bellows supported rotary face seal assembly generally designated by the numeral 10. The assembly surrounds a rotating shaft 11 and is retained within an annular recess 12 in a housing 13 such as by a press fit between the housing and the assembly.

The assembly 10 comprises a metallic formed or welded bellows 14 fabricated in the conventional manner. A formed bellows is usually made from one piece of metal whereas a welded bellows is made from numerous annular laminations with their inner and outer flanges welded together to form a bellows as will be readily understood by those skilled in the art. Joined to one axial end of the bellows, preferably by welding, is an annular bellows carrier ring 15 and jointed to the opposite end is an annular seal carrier ring 16.

Figure 2:
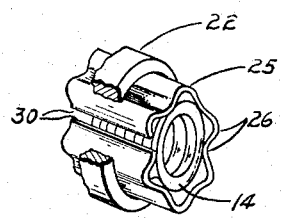
FIGURE 2 is an isometric view of the damping member.

A seal ring or member 17 is carried in a recess 18 in ring 16. The seal ring is conventionally made of carbon because of its friction and wear-resistant properties although other materials may be utilized if desired. A mating ring 19 is shrunk on or otherwise suitably joined to shaft 11 in axial face to face relation with seal ring 17. The surface 21 of seal ring 17 is usually plain and unbroken for liquid sealing as illustrated in FIG. 1 and is usually grooved and vented for gaseous sealing as illustrated in FIG. 2. The reasons for this are well understood in the art and will not be further discussed since it forms no part of this invention.

The bellows 14 may be made with a compression spring rate according to the desired pressure between the sealing surfaces, which pressure will vary depending upon the medium being sealed and the material used for the seal ring and mating ring. For example, for liquid service the face loading on the sealing surface 21 may vary from one to five pounds per square inch whereas for gas service it may be only a fraction of this load.

Joined to carrier ring 15 is a tubular member 22 having an inwardly extending flange 23 adapted for joining to shoulder 24 on the carrier ring. The inner diameter of the tubular member 22 is substantially larger than the outer diameter of the bellows 14 thus defining an annular space 27 surrounding the bellows for substantially its entire length.

Figure 7:
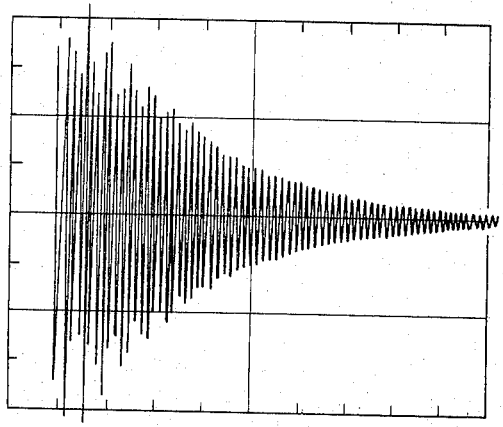
FIGURE 7 represents an actual oscilloscope trace of a transient vibration in a conventional bellows of the heretofore known type.

The seal described so far will seal zone A from zone B, but the seal would be subjected to vibration, an example of which is illustrated in FIG. 7. In accordance with this invention, the vibration is damped as illustrated, for example in FIG. 8.

To damp the bellows, there is disposed within space 27 a damping ring 25 having an axial length slightly less than the axial length of bellows 14. The damping ring 25 is generally tubular but has a number of convolutions or waves 26 therein as best illustrated in FIG. 2. The free height of the convolutions is slightly greater than the radial thickness of the annular space 27 so that when the damping ring is inserted in the space, the convolutions exert a pressure alternately against the bellows 14 and the tubular member 22. For example, the free height of the convolutions may be 0.057 inch and the operating height may be 0.047 inch. Thus, the convolutions will be compressed 0.010 inch when inserted in the annular space.

The damping ring 25 is conveniently made from a thin strip of metal, for example, spring steel having a thickness of about 0.007 inch, and having metallurgical properties enabling it to maintain springiness at high temperatures such as 1000° F. Preferably, the convolutions are formed in the flat stock and thereafter formed into tubular form with the ends 30 spaced apart to permit radial compression. The number of convolutions is not critical; at least three convolutions around the circumference are necessary and more are desirable.

The mating ring 19 is conventional and may conveniently be formed as an annular flange on the shaft 11. However, it is sometimes desirable to have the mating ring separable from the shaft so that it can be hardened and ground to provide a better sealing surface, and the ring may be secured to the shaft in any conventional manner such as by a press fit or by retaining it against a shoulder by means of a sleeve 20 pressed on shaft 11.

If desired, an outer sleeve 28 may be provided which is joined to and surrounds the tubular member 22 and has an inwardly extending annular lip portion overlying the seal carrier ring 16 so that the axial expansion of the bellows is limited. This feature thus protects the bellows and the lip portion may be used to facilitate seating of the seal assembly in the recess 12. If desired, an outwardly extending flange (not shown) may be provided adjacent the lip portion to permit bolting of the seal assembly to the housing 13.

Since the bellows is usually vibrated axially as well as radially, there is usually some relative movement between the bellows 14 and the damping ring 25. Such relative sliding movement, of course, tends to wear both the bellows and the damping ring. To lessen the amount of wear, either the bellows or the damping ring may be coated with a material having a desirable coefficient of friction and/or good resistance to wear. For example, the ring may be coated with polytetrafluoroethylene or alumina.

Figure 4:
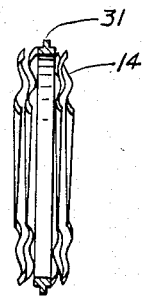
FIGURE 4 illustrates a wear ring type of wear surface for the damper.

In an embodiment of the invention, wear rings 31 as best illustrated in FIG. 4 is provided along with the diaphragms of the bellows. In this embodiment, wear rings 31, of slightly larger diameter than the bellows, are welded between the individual diaphragms. Such rings provide a cylindrical surface upon which the damping ring 25 can ride as opposed to the generally rough surface provided by the weld bead of welded bellows. Depending upon the application, the wear rings may be provided between all of the diaphragms if desired.

Figure 3:
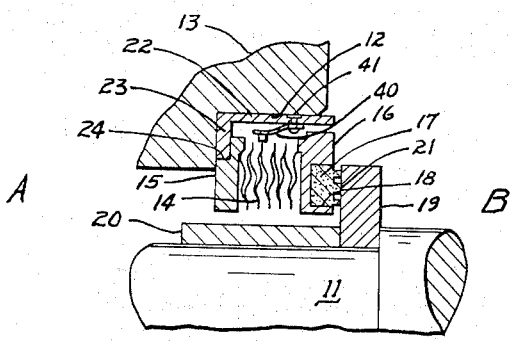
FIGURE 3 is a view similar to FIG. 1 showing another embodiment of the invention.

Another embodiment of the invention is illustrated in FIG. 3. In this mode, finger-like springs 40 are substituted for the damping ring 25. They are preferably formed from flat spring stock; being bent so that one end may be joined to the tubular member 22 by welding or with rivets 41 as shown. The opposite end is disposed inwardly so as to bear upon the outer periphery of the bellows and thus dampen vibrations therein. Any number of fingers springs may be angularly spaced around the bellows and preferably at least three are used equidistantly.

Figure 6:
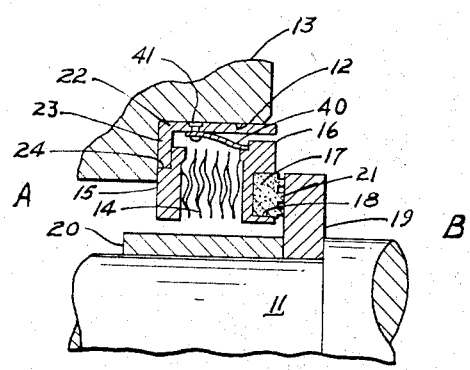
FIGURE 6 illustrates an alternate application of the embodiment of FIG. 3.

As illustrated in FIG. 6, the finger springs may be mounted so that they exert pressure upon the seal carrier ring 16. This prevents radial vibrations in the carrier ring. Utilizing the carrier ring automatically provides a wear surface upon which the damper reacts.

Figure 5:
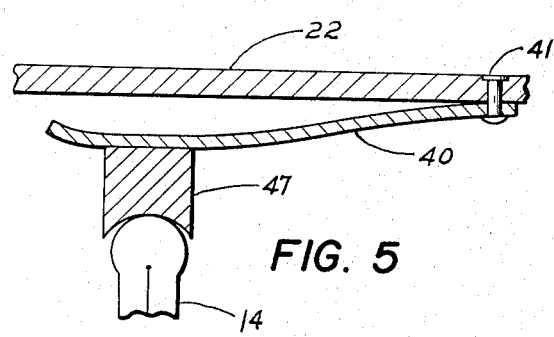
FIGURE 5 illustrates another type of wear surface.

Similar to the embodiment of FIG. 1, it is desirable to provide a wear surface upon which the finger springs may slide. The wear surface may be the wear rings 31 or, alternately, split rings 47 may be utilized. These rings are grooved in their inner diameter so as to fit over the diaphragm weld bead or diaphragm fold as the case may be as best illustrated in FIG. 5. Rings 47 are preferably resilient so that they may be sprung open and slipped around the diaphragm fold and their resiliency utilized to retain them in place. If metallic, the split may be welded to permanently secure them. Thus, there is provided a wear surface upon which either the finger springs 40 or convoluted damping ring 25 may ride. If metallic, the wear surface may be coated as hereinbefore described although non-metallic rings made from polytetrafluoroethylene may be used with advantage.

In operation, bellows 14, having either wear rings 31 or 47 jointed thereto if desired as already described, is joined to the carrier rings 15 and 16. Tubular member 22 is then joined to carrier ring 15 and outer sleeve 28 is joined to the tubular member so that lip portion 29 restrains the seal carrier ring 16. Thereafter seal ring 17 is placed in the seal ring recess 18 and the whole assembly is placed in recess 12 of housing 13 and secured as already described. The shaft 11 with the mating ring 19 secured thereto may then be inserted within the seal assembly so that the mating ring compresses the bellows the desired amount. The convolutions of tubular member 25 alternately contact the outer periphery of the bellows 14 and the perimeter of member 22. Of course, if desired tubular member 25 may bear directly against housing 13. Any vibration initiated in bellows 14 tends to flex the tubular member 25. Thus the member 25 absorbs the energy of vibration and dissipates the energy.

Figure 8:
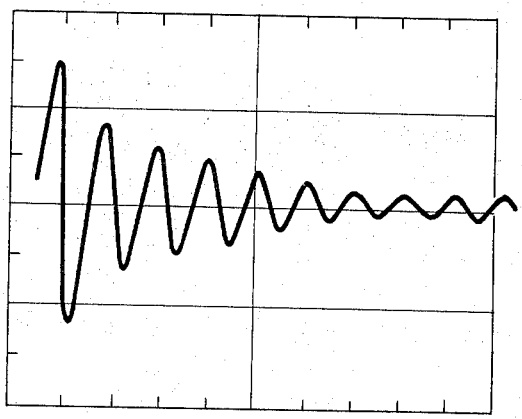
FIGURE 8 represents an actual oscilloscope trace of a transient vibration in a bellows damped in accordance with this invention.

The capacity of the invention to provide a damped seal assembly has been proven in the laboratory and in the field. FIG. 7 represents an actual oscilloscope trace of a transient vibration introuced into an undamped assembly. FIG. 8 represents an actual oscilloscope trace of a transient vibration introduced into the damped assembly of FIG. 1. It can be seen readily that the frequency of vibrations and the magnitude of the vibrations is reduced by the seal of this invention.

Having thus described our invention in its best embodiment and mode of operation, what we desire to claim by Letters Patent is:

1. A face seal for a rotating shaft comprising:
    a bellows;
    a first carrier ring jointed at one end of said bellows;
    a tubular flange radially spaced from said bellows so as to define an annular space surrounding said bellows;
    a second carrier ring jointed to the opposite end of said bellows and carrying a sealing ring;
    said bellows maintaining said sealing ring in sealing engagement with an annular sealing surface on said shaft; and
    a resilient finger extending angularly from said flange and having its one end fixed to said tubular flange and its other end engaging a wear-resistant surface that engages a fold of said bellows for damping vibrations in said bellows.

2. The sealing apparatus of claim 1 wherein said wear-resistant surface comprises an annular ring overlying and secured to a fold of said bellows and on engagement with both of said fold and said finger.

3. The seal apparatus of claim 1 wherein said wear-resistant surface comprises an annular ring secured between the folds of said bellows and engaging said finger.

References Cited

UNITED STATES PATENTS

| | | | |
|---|---|---|---|
| 1,822,052 | 9/1931 | Maccabee | 277—88 |
| 1,860,860 | 5/1932 | Kennedy. | |
| 2,601,996 | 7/1952 | Sefren | 277—88 X |
| 2,740,648 | 4/1956 | Amblard | 277—89 |
| 2,862,521 | 12/1958 | Fenoglio | 92—41 |
| 2,911,266 | 11/1959 | Metzke | 277—88 X |
| 3,213,764 | 10/1965 | Nelson et al. | 92—41 |
| 3,276,780 | 10/1966 | Andresen et al. | 277—42 |

FOREIGN PATENTS 467,916    4/1950    Canada.

LAVERNE D. GEIGER, *Primary Examiner.*

J. S. MEDNICK, *Assistant Examiner.*